United States Patent
Shao et al.

(10) Patent No.: US 11,870,328 B2
(45) Date of Patent: Jan. 9, 2024

(54) COMBINED COOLING SYSTEM FOR MOTOR AND MOTOR CONTROLLER

(71) Applicant: Jing-Jin Electric Technologies Co., Ltd., Beijing (CN)

(72) Inventors: Kuizhu Shao, Beijing (CN); Zhichao Zhang, Beijing (CN); Yu Duan, Beijing (CN); Jinhe Xu, Beijing (CN)

(73) Assignee: JING-JIN ELECTRIC TECHNOLOGIES CO., LTD.

( * ) Notice: Subject to any disclaimer, the term of this patent is extended or adjusted under 35 U.S.C. 154(b) by 121 days.

(21) Appl. No.: 17/364,364

(22) Filed: Jun. 30, 2021

(65) Prior Publication Data
US 2022/0123629 A1 Apr. 21, 2022

(30) Foreign Application Priority Data
Oct. 16, 2020 (CN) .......................... 202022307041.9

(51) Int. Cl.
*B60K 11/02* (2006.01)
*H02K 9/197* (2006.01)
(Continued)

(52) U.S. Cl.
CPC .......... *H02K 9/197* (2013.01); *B60H 1/00385* (2013.01); *B60H 1/22* (2013.01);
(Continued)

(58) Field of Classification Search
CPC ..... H02K 9/19; H02K 9/197; F01P 2003/008; B60K 11/02
See application file for complete search history.

(56) References Cited

U.S. PATENT DOCUMENTS 10,287,964 B2 * 5/2019 Tokozakura .............. B60K 1/02
10,960,752 B2 * 3/2021 Takeno ..................... B60K 1/00

FOREIGN PATENT DOCUMENTS

| CN | 111313611 A | 6/2020 |
| DE | 102011117102 A1 | 5/2012 |
| EP | 3517335 | 7/2019 |

OTHER PUBLICATIONS

European Search Report which issued in connection with a corresponding foreign application dated Apr. 7, 2022.

* cited by examiner

*Primary Examiner* — Ramon M Barrera
(74) *Attorney, Agent, or Firm* — Clark Hill PLC; James R. Foley

(57) ABSTRACT

The present disclosure discloses a combined cooling system for a motor and a motor controller, which comprises a water cooling assembly, an oil cooling assembly, and an oil-water heat exchanger; one end of the water cooling assembly is connected to an cooling water outlet of the motor, the other end is connected to an cooling water inlet of the motor controller and/or a water inlet of the oil-water heat exchanger; one end of the oil cooling assembly is connected to a cooling oil outlet of the motor, the other end of the oil cooling assembly is connected to an oil inlet of the oil-water heat exchanger, and an oil outlet of the oil-water heat exchanger is connected to a cooling oil inlet of the motor. The above technical solution utilizes the temperature characteristics of the motor and the motor controller, and achieves the objects of saving energy in cooling, and improving high power output performance and environmental adaptability of the motor through the cooperation and intelligent control of the water pump, oil pump and fan in the combined cooling system.

3 Claims, 3 Drawing Sheets

(51) Int. Cl.
    *H02K 11/30*          (2016.01)
    *B60H 1/00*           (2006.01)
    *B60H 1/22*           (2006.01)
    *B60H 1/32*           (2006.01)
    *H02K 9/20*           (2006.01)
    *H02K 9/00*           (2006.01)
    *H02K 9/19*           (2006.01)
    *B60K 1/00*           (2006.01)
    *F01P 3/00*           (2006.01)

(52) U.S. Cl.
    CPC ............ *B60H 1/3227* (2013.01); *B60K 11/02* (2013.01); *H02K 9/00* (2013.01); *H02K 9/19* (2013.01); *H02K 9/20* (2013.01); *H02K 11/30* (2016.01); *B60K 1/00* (2013.01); *B60K 2001/006* (2013.01); *F01P 2003/008* (2013.01)

COMBINED COOLING SYSTEM FOR MOTOR AND MOTOR CONTROLLER

TECHNICAL FIELD

The present disclosure belongs to the technical field of motors, and particularly relates to a combined cooling system for a motor and a motor controller.

BACKGROUND

The drive motors of existing new energy vehicles often only use an independent water cooling system or an independent oil cooling system. As the power density of the drive motor increases, a more effective cooling system is required to ensure the continuous high power and high torque output of the motor.

The water cooling of motor uses heat conduction. The heat generated by the motor windings and bearings is first transferred to the motor housing provided with cooling water pipes therein, a part of the heat is taken away by the coolant, and then the radiator cools the water. The oil cooling of motor directly transports the cooling oil to the heated part by spraying, which can quickly and accurately take away the heat, and then the heat exchanger cools the oil.

How to combine and apply the above two cooling methods to the motor cooling of new energy vehicles to maximize the cooling effect is a technical problem that needs to be solved urgently.

SUMMARY

In view of the above problems, the present disclosure discloses a combined cooling system for a motor and a motor controller to overcome the above problems or at least partially solve the above problems.

In order to achieve the above object, the present disclosure adopts the following technical solutions:

A combined cooling system for a motor and a motor controller, wherein the cooling system comprises a water cooling assembly, an oil cooling assembly, and an oil-water heat exchanger; one end of the water cooling assembly is connected to an cooling water outlet of the motor, the other end of the water cooling assembly is only connected to an cooling water inlet of the motor controller, an cooling water outlet of the motor controller is connected to a water inlet of an oil-water heat exchanger, and a water outlet of the oil-water heat exchanger is connected to a cooling water inlet of the motor; or, the other end of the water cooling assembly is connected to the cooling water inlet of the motor controller and the water inlet of the oil-water heat exchanger respectively, and the cooling water outlet of the motor controller and the water outlet of the oil-water heat exchanger are respectively connected to the cooling water inlet of the motor; or, the other end of the water cooling assembly is connected to the cooling water inlet of the motor controller and the water inlet of the oil-water heat exchanger respectively, and the cooling water outlet of the motor controller and the water outlet of the oil-water heat exchanger are respectively connected to a water inlet of the radiator of the water cooling assembly and the cooling water inlet of the motor;

one end of the oil cooling assembly is connected to a cooling oil outlet of the motor, the other end of the oil cooling assembly is connected to an oil inlet of the oil-water heat exchanger, and an oil outlet of the oil-water heat exchanger is connected to a cooling oil inlet of the motor.

Optionally, the water cooling assembly comprises a radiator, a fan, a first water pump, and a water pipe, the radiator is connected in series with the first water pump, and the fan is used for cooling the radiator;

the oil cooling assembly comprises an oil pump and an oil pipe, and the oil pump is connected in series between the cooling oil outlet of the motor and the oil inlet of the oil-water heat exchanger via the oil pipe.

Optionally, when the other end of the water cooling assembly is only connected to the cooling water inlet of the motor controller, the first water pump may also be connected in series between the cooling water outlet of the motor controller and the water inlet of the oil-water heat exchanger via the water pipe; or, the first water pump may also be connected in series between the water outlet of the oil-water heat exchanger and the cooling water inlet of the motor via the water pipe.

Optionally, the water cooling assembly comprises a radiator, a fan, a second water pump, a third water pump and a water pipe, the second water pump and the third water pump are connected in parallel and then are connected in series to the radiator, the water outlet of the second water pump is connected to the cooling water inlet of the motor controller, and the cooling water outlet of the motor controller is connected to the cooling water inlet of the motor;

a water outlet of the third water pump is connected to a water inlet of the oil-water heat exchanger, and a water outlet of the oil-water heat exchanger is connected to the cooling water inlet of the motor.

Optionally, the oil pump may also be connected in series between the oil outlet of the oil-water heat exchanger and the cooling oil inlet of the motor.

Optionally, the oil cooling assembly is further provided with an oil cooling radiator and an oil cooling fan, and the oil cooling radiator and the oil cooling fan may be provided separately, or shared with the radiator and the fan in the water cooling assembly.

Optionally, the motor controller, the water cooling assembly and the oil cooling assembly are controlled by a controller.

Optionally, the controller is a vehicle controller or a cooling system controller.

Optionally, the cooling system further comprises an air-conditioning cooling assembly, the air-conditioning cooling assembly comprises an air-conditioning pipeline and a condenser, and the condenser is arranged on the oil-water heat exchanger to reduce a temperature of a fluid in the oil-water heat exchanger.

Optionally, the air-conditioning cooling assembly is controlled by a vehicle controller or a cooling system controller.

The advantages and beneficial effects of the present disclosure are as follows.

The technical solution disclosed by the present disclosure utilizes the characteristic that the operating temperature of the motor controller is lower than the operating temperature of the motor, and disposes the motor controller closer to the water cooling assembly to meet the requirements of normal operation of the motor. Moreover, through the cooperation in the combined cooling system, the consumption of electric energy can be reduced, the cooling effect of the motor can also be improved, and the environmental adaptability of the motor can be effectively enhanced.

Furthermore, the present disclosure realizes the linked and intelligent control of the water pump, oil pump and fan in the combined cooling system, obtains the greatest comprehensive benefit, and improves the balance of energy saving and cooling performance of the combined cooling system.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals denote the same components. In the drawings.

Figure 1:
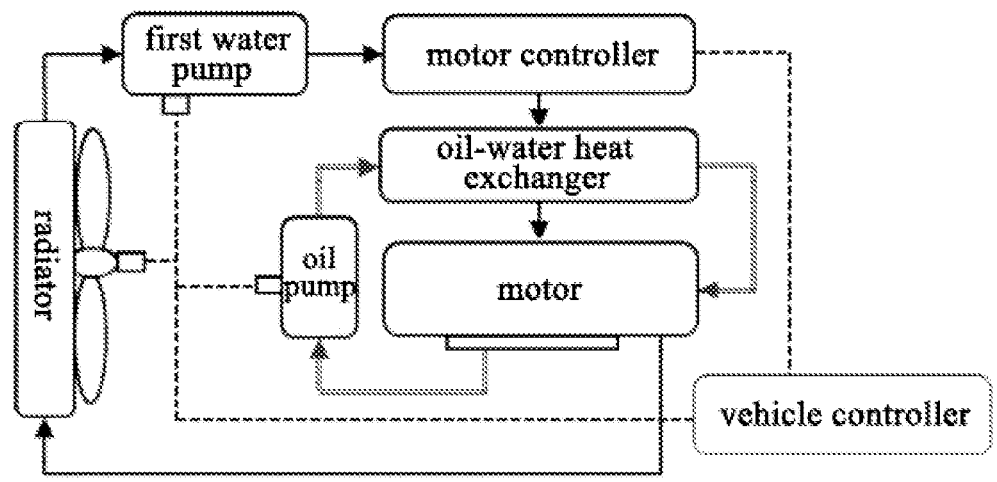
FIG. 1 is a schematic diagram of the structure of a combined cooling system according to an embodiment of the present disclosure.

In the drawings: the double solid line represents the cooling oil circuit, the single solid line represents the cooling water circuit, the dashed line represents the control circuit, and the thick solid line represents the air conditioning pipeline.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The motor controller is an integrated circuit that controls the motor to work in accordance with the set direction, speed, angle, and response time through active work. In an electric vehicle, the function of the motor controller is to, according to instructions such as gear position, throttle position and brake, convert the electric energy stored in the power battery into the electric energy required to drive the motor, control the driving conditions such as start-up, advance and retreat speed, and climbing ability of the electric vehicle, or help the electric vehicle to brake and store part of the braking energy in the power battery. It is one of the key components of electric vehicles. Generally, the operating temperature of the motor controller is lower than the operating temperature of the motor. For example, the motor controller works at about 90 degrees Celsius, while the motor body can withstand a high temperature of more than 100 degrees Celsius.

In order to solve the motor cooling problem so that it will no longer be a limitation of increasing the power density of the motor, in the present disclosure, considering the actual situation that the operating temperature of the motor controller is lower than the operating temperature of the motor, an effective combined cooling system for cooling the motor is designed, which can effectively improve the cooling efficiency of the motor and obtain the maximum benefit of energy consumption and cooling efficiency.

The technical solutions according to the embodiments of the present disclosure will be described in detail below with reference to the accompanying drawings.

Referring to FIGS. 1, 3-5 which show a combined cooling system for a motor and a motor controller, the combined cooling system comprises a water cooling assembly, an oil cooling assembly, and an oil-water heat exchanger.

The water cooling assembly comprises a radiator, a fan, a plurality of water pumps, and a water pipe. The radiator is connected in series with the water pumps, and the plurality of water pumps are connected in parallel. The fan is used to cool the radiator. The oil cooling assembly comprises an oil pump and an oil pipe. The oil pump is connected in series between the cooling oil outlet of the motor and the oil inlet of the oil-water heat exchanger via the oil pipe.

There are multiple combinations of water cooling and oil cooling.

Combination 1: as shown in FIG. 1, there is only one water pump in the water cooling assembly, namely the first water pump. At this point, one end of the water cooling assembly is connected to an cooling water outlet of the motor, the other end of the water cooling assembly is only connected to an cooling water inlet of the motor controller, an cooling water outlet of the motor controller is connected to a water inlet of an oil-water heat exchanger, and a water outlet of the oil-water heat exchanger is connected to a cooling water inlet of the motor.

At this point, one end of the oil cooling assembly is connected to a cooling oil outlet of the motor, the other end of the oil cooling assembly is connected to an oil inlet of the oil-water heat exchanger, and an oil outlet of the oil-water heat exchanger is connected to a cooling oil inlet of the motor.

As a result, the cooling water in the water cooling assembly is used to cool the oil in the cooling oil circuit, and the cooling source includes only a fan and a radiator.

In order to enhance the cooling effect, a fan and a radiator may also be added in the oil cooling assembly as cooling sources.

Figure 3:
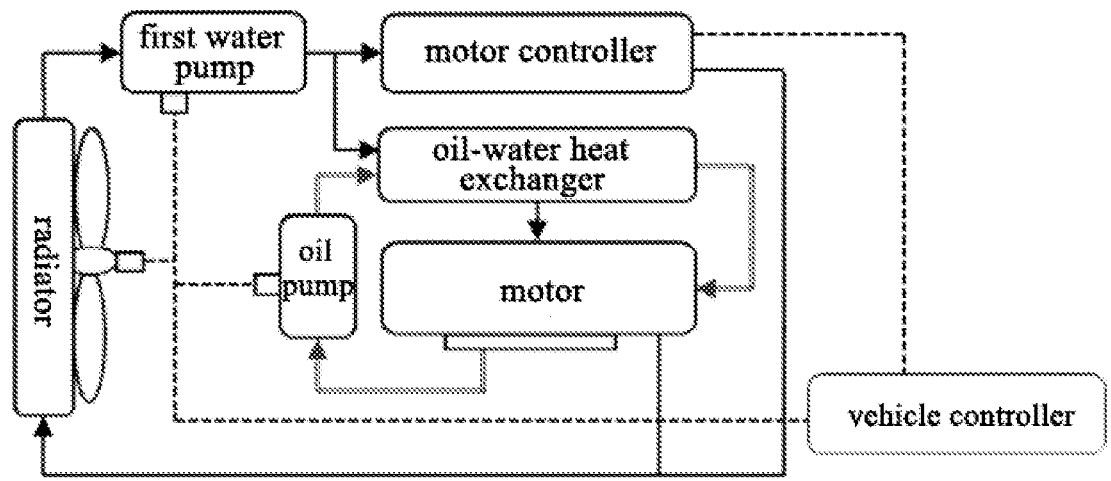
FIG. 3 is a schematic diagram of the structure of a different water pump connection relationship of the embodiment of FIG. 1.

Combination 2: as shown in FIG. 3, one end of the water cooling assembly is connected to the cooling water outlet of the motor, the other end of the water cooling assembly is connected to the cooling water inlet of the motor controller and the water inlet of the oil-water heat exchanger respectively, and then the cooling water outlet of the motor controller and the water outlet of the oil-water heat exchanger are respectively connected to the water inlet of the radiator of the water cooling assembly and the cooling water inlet of the motor. At this point, since the cooling water passing through the oil-water heat exchanger does not pass through the motor controller, the effect of heat exchange is better, and it is more conducive to reducing the temperature of the oil in the oil-water heat exchanger.

Since the connection of the oil cooling assembly is the same as the previous combination, it is not repeated herein.

Figure 4:
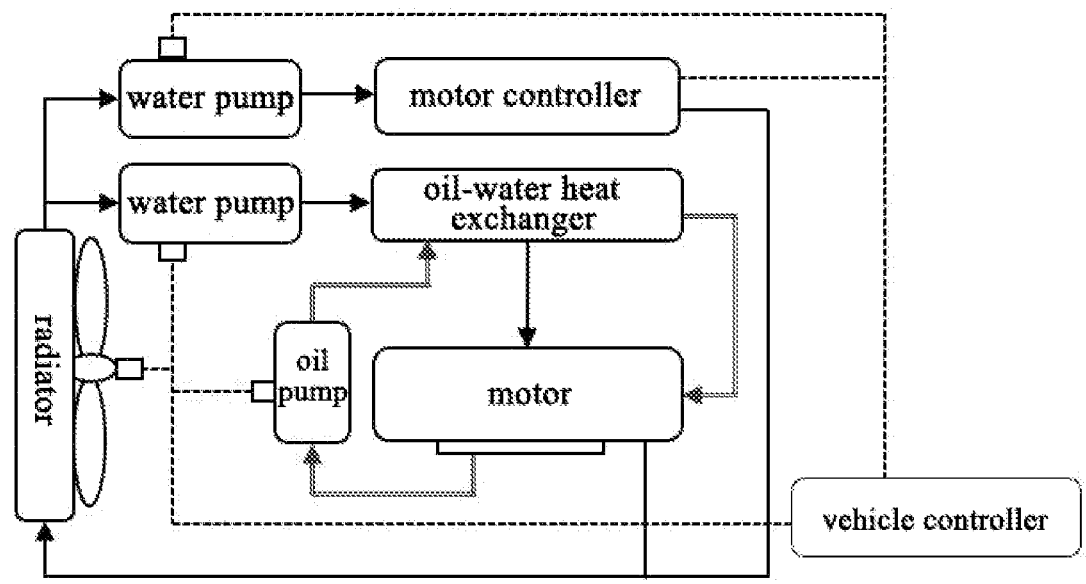
FIG. 4 is a schematic diagram of the structure of a combined cooling system according to another embodiment of the present disclosure.

Combination 3: as shown in FIG. 4, the water cooling assembly comprises two water pumps: a second water pump and a third water pump. The second water pump is connected to the motor controller for cooling the motor controller. The water outlet of the third water pump is connected to the water inlet of the oil-water heat exchanger, and the water outlet of the oil-water heat exchanger is connected to the cooling water inlet of the motor, so as to cool the high-temperature oil in the cooling oil circuit.

At this point, one end of the oil cooling assembly is connected to a cooling oil outlet of the motor, the other end of the oil cooling assembly is connected to an oil inlet of the oil-water heat exchanger, and an oil outlet of the oil-water heat exchanger is connected to a cooling oil inlet of the motor.

In this combination, two water pumps are provided to ensure sufficient water flow rates, which have a better cooling effect on both the motor controller and the oil-water heat exchanger.

It should be noted that in the combination 2 and the combination 3, the cooling water outlet of the motor controller and the water outlet of the oil-water heat exchanger are respectively connected to the water inlet of the radiator of the water cooling assembly and the cooling water inlet of the motor, thereby separately cooling the motor controller and the motor by dividing the cooling water from the radiator (i.e., the water cooling assembly), which improves the cooling efficiency of the combined cooling system and obtains a better cooling effect.

Figure 5:
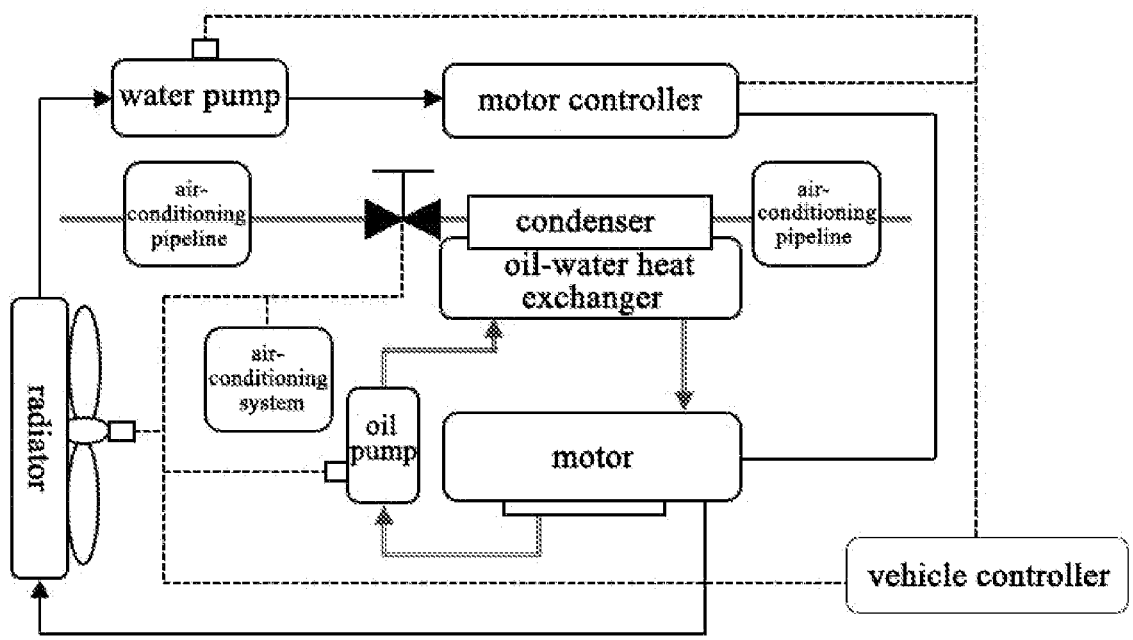
FIG. 5 is a schematic diagram of the structure of a combined cooling system according to yet another embodiment of the present disclosure.

Combination 4: as shown in FIG. 5, in the present embodiment, the condenser in the air-conditioning assembly is introduced to cool the oil-water heat exchanger. The air-conditioning cooling assembly comprises an air-conditioning pipeline and the condenser. The condenser is arranged on the oil-water heat exchanger, and is used to reduce the temperature of the fluid in the oil-water heat exchanger.

In the case of the combination 4, the condenser can only cool the oil circuit, and the circulation in the water cooling assembly may no longer be introduced into the oil-water heat exchanger. Of course, the water in the cooling water circuit may still be introduced into the oil-water heat exchanger.

Of course, the embodiments of the combined cooling system of the present disclosure are not limited to these. If needed, the water circuit connection can be adjusted as shown in FIG. 3, or the quantity of water pumps can be adjusted as shown in FIG. 4, and all other embodiments that can improve the combined cooling efficiency of the motor are within the protection scope of the disclosure.

In an embodiment, when the other end of the water cooling assembly is only connected to the cooling water inlet of the motor controller, the first water pump may also be connected in series between the cooling water outlet of the motor controller and the water inlets of the oil-water heat exchanger via a water pipe; or, the first water pump may also be connected in series between the water outlet of the oil-water heat exchanger and the cooling water inlet of the motor via a water pipe. In other words, the first water pump may be arranged at any place in the cooling water circuit, so as to realize the cooling water circulation in the water circuit.

In an embodiment, if needed, the oil pump may also be connected in series between the oil outlet of the oil-water heat exchanger and the cooling oil inlet of the motor. In other words, the oil pump may be arranged at any place in the cooling oil circuit to realize the cooling oil circulation in oil circuit.

In an embodiment, an oil cooling radiator and an oil cooling fan are also provided in the oil cooling assembly, and the oil cooling radiator and the oil cooling fan may be provided separately, or share with the radiator and the fan in the water cooling assembly, thereby enhancing the cooling effect.

In an embodiment, the motor controller, the water pump and fan in the water cooling assembly, and the oil pump in the oil cooling assembly may be controlled by the controller. According to the load and working conditions, the flow rate of the water pump and the oil pump can be adjusted, and the water pump and the oil pump can be started or stopped, the wind speed of the fan can be controlled, and the fan can be started or stopped. The controller may be a cooling system controller or a vehicle controller.

Figure 2:
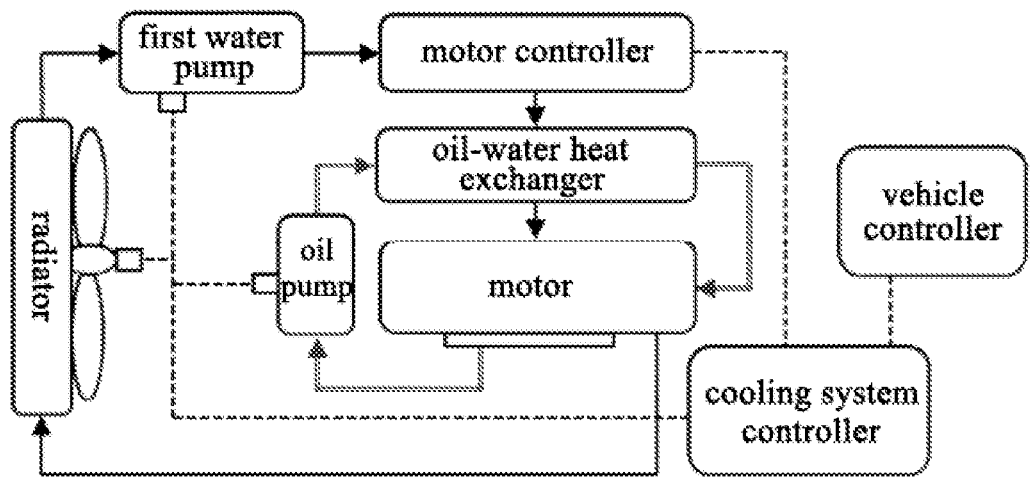
FIG. 2 is a schematic diagram of a different control structure of the embodiment of FIG. 1.

For example, in a specific embodiment, as shown in FIG. 2, the water cooling assembly and the oil cooling assembly are controlled by a special cooling system controller, and the cooling system controller is further controlled by a vehicle controller. Control instructions are transferred between the cooling system controller and the vehicle controller.

When an air-conditioning cooling assembly is provided, as shown in FIG. 5, similarly, the air-conditioning cooling assembly may be controlled by a cooling system controller or directly controlled by a vehicle controller.

In sum, the embodiments of the present disclosure disclose a variety of structures of combined cooling system of motor. They have an independent water cooling system, which can effectively ensure a stable and continuous power output of the motor. They have an independent oil cooling system, which can effectively increase the power density of the motor. The two systems can be used in combination. Different strategies are adopted under different working conditions. The combined control of the two systems is achieved by controlling the cooling fan, water pump, and oil pump. When the natural environment temperature is high and the vehicle is under high load, the two systems can be operated at full load. The above system can effectively improve the motor power, torque density, and effectively improve the environmental adaptability of motor.

The above are only the embodiments of the present disclosure, and are not used to limit the protection scope of the present disclosure. Any modification, equivalent replacement, improvement, expansion, etc. made within the spirit and principle of the present disclosure shall all be included in the protection scope of the present disclosure.

What is claimed is:

1. A combined cooling system of a motor and a motor controller, wherein the cooling system comprises a water cooling assembly, an oil cooling assembly, and an oil-water heat exchanger;
   the water cooling assembly comprises a radiator, a fan, a first water pump, and a water pipe, the radiator is connected in series with the first water pump, and the fan is used for cooling the radiator;
   the oil cooling assembly comprises an oil pump and an oil pipe, and the oil pump is connected in series between the cooling oil outlet of the motor and the oil inlet of the oil-water heat exchanger via the oil pipe;
   one end of the water cooling assembly is connected to a cooling water outlet of the motor, the other end of the water cooling assembly is only connected to a cooling water inlet of the motor controller, a cooling water outlet of the motor controller is connected to a water inlet of an oil-water heat exchanger, and a water outlet of the oil-water heat exchanger is connected to a cooling water inlet of the motor; and
   one end of the oil cooling assembly is connected to a cooling oil outlet of the motor, the other end of the oil cooling assembly is connected to an oil inlet of the oil-water heat exchanger, and an oil outlet of the oil-water heat exchanger is connected to a cooling oil inlet of the motor.

2. The cooling system according to claim 1, wherein the motor controller, the water cooling assembly and the oil cooling assembly are controlled by a controller.

3. The cooling system according to claim 2, wherein the controller is a vehicle controller or a cooling system controller.

* * * * *